(12) United States Patent
Sun et al.

(10) Patent No.: US 8,264,832 B2
(45) Date of Patent: Sep. 11, 2012

(54) HARD DISK CONNECTING MECHANISM AND HARD DISK ASSEMBLY USING THE SAME

(75) Inventors: Zheng-Heng Sun, Taipei Hsien (TW); An-Gang Liang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 272 days.

(21) Appl. No.: 12/855,899

(22) Filed: Aug. 13, 2010

(65) Prior Publication Data

US 2011/0235265 A1 Sep. 29, 2011

(30) Foreign Application Priority Data

Mar. 26, 2010 (CN) .......................... 2010 1 0132953

(51) Int. Cl.
*G06F 1/16* (2006.01)
*H01R 13/64* (2006.01)
*H01R 25/00* (2006.01)
(52) U.S. Cl. ................... 361/679.33; 439/680; 439/677; 439/638

(58) Field of Classification Search .. 361/679.31–679.4, 361/724–727; 312/223.1, 223.2; 439/680, 439/677, 638
See application file for complete search history.

(56) References Cited

U.S. PATENT DOCUMENTS

| 4,941,841 | A | * | 7/1990 | Darden et al. | ........... 361/679.39 |
| 4,986,618 | A | * | 1/1991 | Wakatsuki | .................... 312/276 |
| 6,361,372 | B1 | * | 3/2002 | Chiang | ......................... 439/680 |
| 6,639,792 | B1 | * | 10/2003 | Chang | ........................ 361/679.4 |
| 2007/0047194 | A1 | * | 3/2007 | Tsai | .............................. 361/685 |
| 2008/0089022 | A1 | * | 4/2008 | Cheung et al. | ................ 361/685 |
| 2008/0239650 | A1 | * | 10/2008 | Fujie et al. | .................... 361/685 |
| 2009/0273896 | A1 | * | 11/2009 | Walker et al. | ............ 361/679.33 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A hard disk assembly includes a first and a second hard disk, and a hard disk connecting mechanism for holding the first and the second hard disks. The first and second hard disks both each have a composite receptacle. The hard disk connecting mechanism includes a frame for mounting the first and the second hard disks and a composite connector detachably positioned in the frame. The composite connector includes a base, a first composite plug engaged with the composite receptacle of the first hard disk and a second composite plug engaged with the composite receptacle of the second hard disk. The frame defines a sliding slot. The base form a sliding protrusion slidably received in the sliding slot to slidably position the composite connector in the frame.

11 Claims, 4 Drawing Sheets

HARD DISK CONNECTING MECHANISM AND HARD DISK ASSEMBLY USING THE SAME

This application is related to a co-pending U.S. patent application which is: and application Ser. No. 12/855,891, and entitled "COMPOSITE CONNECTOR AND HARD DISK ASSEMBLY USING THE SAME". In the co-pending application, the inventor is ZHENG-HENG SUN. The co-pending application has the same assignee as the present application. The disclosure of the above identified application is incorporated herein by reference.

BACKGROUND

1. Technical Field

The present disclosure relates to a composite connector and, particularly, to a composite connector for connecting a plurality of hard disks and a hard disk assembly using the same.

2. Description of the Related Art

A commonly used hard disk connecting mechanism is generally used for one hard disk only. However, if a plurality of hard disks is needed, the same number of hard disk connecting mechanisms is also needed, and each hard disk employs an electrical connector, a data connector and a plurality of cables for connecting with a motherboard of a computer, resulting in having a complex wire distribution, and is inconvenient for mounting or detaching.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
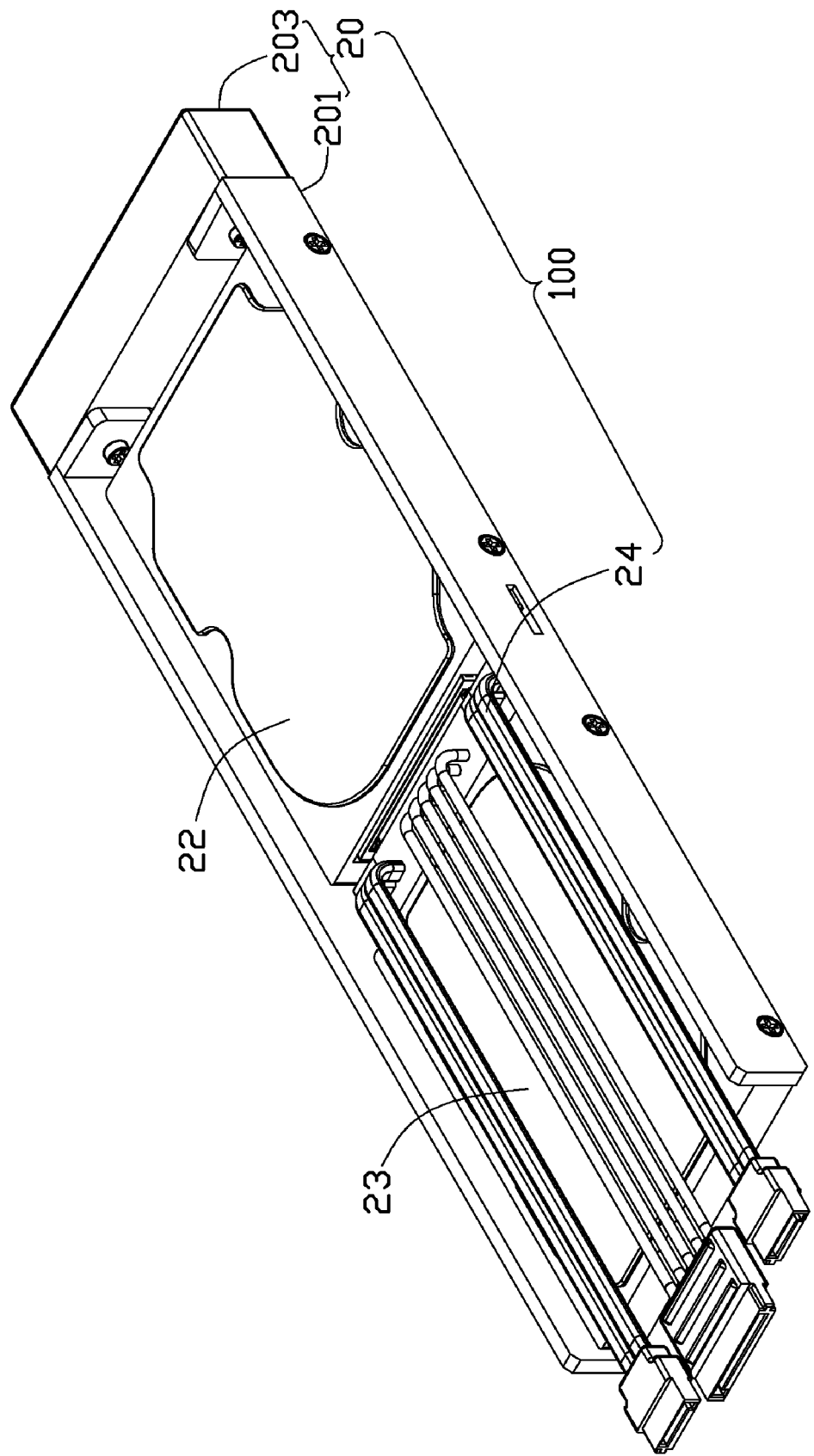
FIG. 1 is an isometric view of an embodiment of a hard disk assembly.
Figure 2:
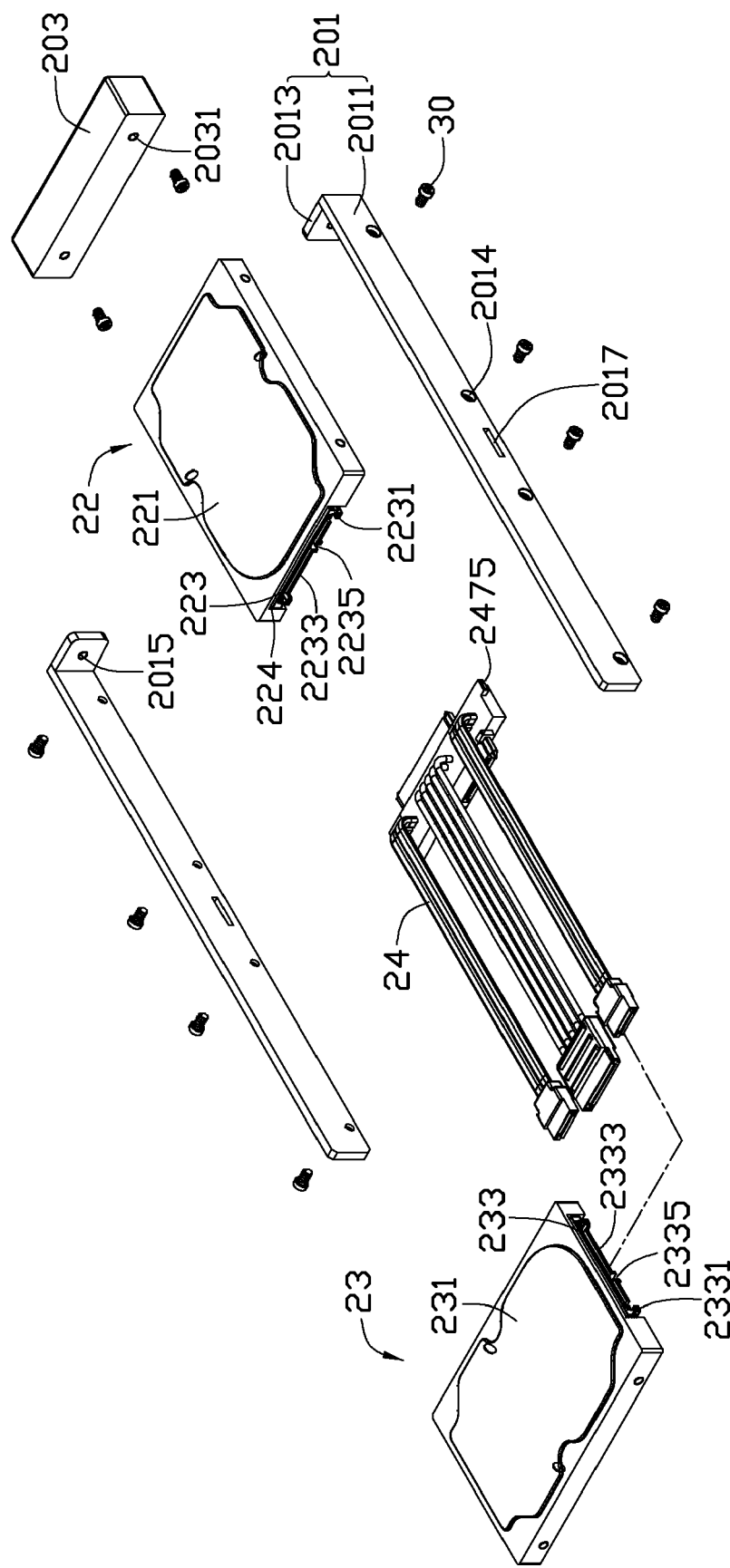
FIG. 2 is an exploded, isometric view of the hard disk assembly shown in FIG. 1, in which the hard disk assembly includes a composite connector.

Referring to FIGS. 1 and 2, an exemplary embodiment of a hard disk assembly includes a hard disk connecting mechanism 100, a first hard disk 22 and a second hard disk 23. The hard disk connecting mechanism 100 includes a frame 20 and a cable connecting assembly 24. The first hard disk 22 and the second hard disk 23 may be Serial Advanced Technology Attachment (SATA) or Integrated Device Electronics (IDE) hard disk.

The frame 20 includes two fixing members 201 and a connecting member 203. Each fixing member 201 includes a longitudinal support portion 2011 and a fixing portion 2013 extending substantially perpendicularly from an end of the longitudinal support portion 2011. The connecting member 203 defines two fixing holes 2031 at each end thereof. Each support portion 2011 defines a plurality of guide holes 2014, which are spaced from each other, for fixing the first hard disk 22 and the second hard disk 23. Each fixing portion 2013 defines a threaded hole 2015 corresponding to the fixing hole 2031 of the connecting member 203, and each support portion 2011 defines a longitudinal sliding slot 2017. In the illustrated embodiment, the sliding slots 2017 passes through the support portion 2011. A screw (not labeled) threads through the threaded hole 2015 of each fixing member 201, and then engages in one of the fixing holes 2031, thus fixing each fixing member 201 at each end of the connecting member 203.

The first hard disk 22 includes a main body 221 and a composite receptacle 223. The main body 221 defines a receiving slot 224 for receiving the composite receptacle 223. The composite receptacle 223 includes a power receptacle 2231 and a data receptacle 2233. The power receptacle 2231 and the data receptacle 2233 cooperatively define a slot 2235 therebetween. The main body 221 defines a plurality of threaded holes (not labeled) at each side for fixing the main body 221. Alternatively, the power receptacle 2231 may be integrally formed with the data receptacle 2233, and some pins of the composite receptacle 223 are capable of transmitting electrical power, while the other pins of the composite receptacle 223 are capable of transmitting data. The second hard disk 23 is similar to the first hard disk 21, and includes a main body 231 and a composite receptacle 233 received in the main body 231. The composite receptacle 233 includes a power receptacle 2331 and a data receptacle 2333. The power receptacle 2331 and the data receptacle 2333 define a slot 2335 therebetween.

Figure 3:
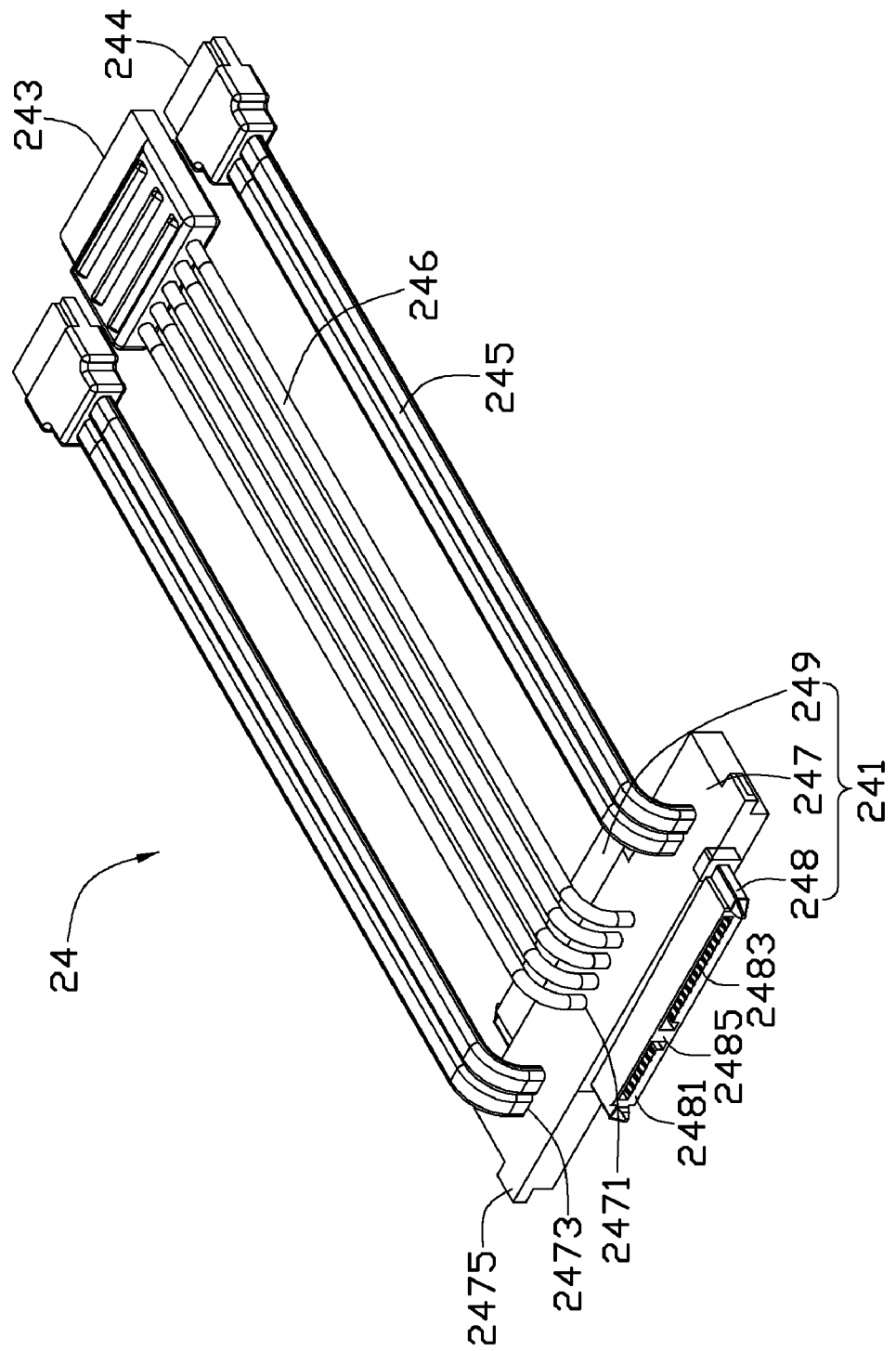
FIG. 3 is an isometric view of the composite connector shown in FIG. 2.
Figure 4:
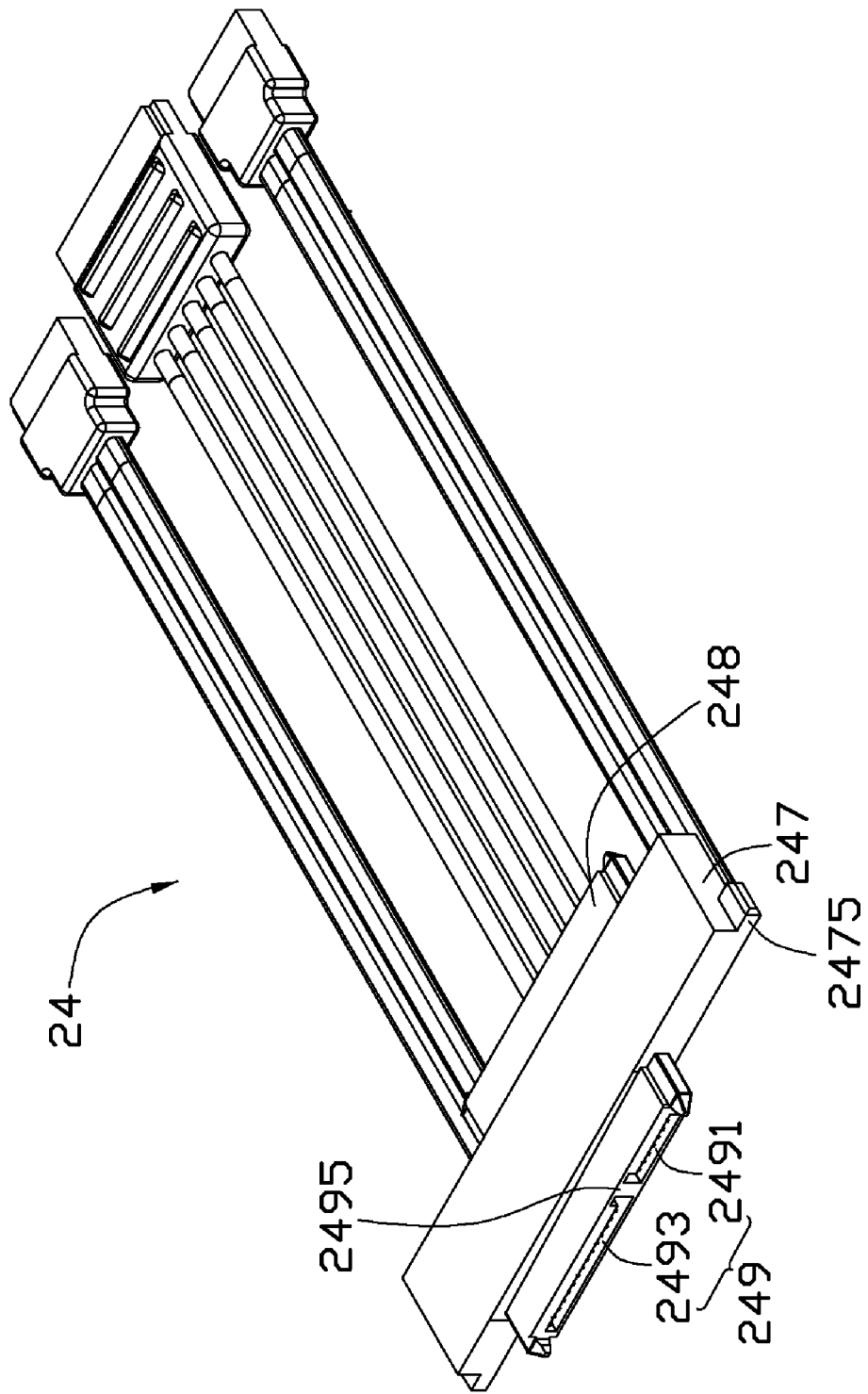
FIG. 4 is similar to FIG. 3, but viewed from another aspect.

Referring also to FIGS. 3 and 4, the cable connecting assembly 24 includes a composite connector 241, an electrical connector 243, two data connectors 244, four data cables 245 and five electrical cables 246. The composite connector 241 includes a longitudinal base 247, a first composite plug 248 corresponding to the composite receptacle 223 of the first hard disk 22 and a second composite plug 249 corresponding to the composite receptacle 233 of the second hard disk 23. The base 247 forms a sliding protrusion 2475 corresponding to the sliding slot 2017 at each end. The first composite plug 248 is formed at a side surface of the base 247; the second composite plug 249 is formed at the other side surface opposite to the first composite plug 248. The first composite plug 248 includes an electrical plug 2481 and a data plug 2483 adjacent to the electrical plug 2481. The electrical plug 2481 includes five conductive pins (not labeled) for being connected to the electrical cable 246; the data plug 2483 includes a plurality of data pins (not labeled) for being connected to the data cable 245. In the illustrated embodiment, the electrical plug 2481 is integrally formed with the data plug 2483, and divided by a partition portion 2485. When the first composite plug 248 engages with the composite receptacle 223, the partition portion 2485 is latched in the slot 2235, to prevent the relative movement of the first composite plug 248 and the composite receptacle 223. The second composite plug 249 is similar to the first composite plug 248, and includes an electrical plug 2491, a data plug 2493 and a partition portion 2495 between the electrical plug 2491 and the data plug 2493. The base 247 defines five wire holes 2471 for the electrical cables 246 to pass through at the middle and two through holes 2473 at each side of the wire holes 2471 for the data cables 245 to pass through. One end of each electrical cable 246 is passed through the wire hole 2471, and is connected to the conductive pin of the electrical plug 2481 of the first composite plug 248 or the second composite plug 249; the other end of the electrical cable 246 is connected to the electrical connector 243. One end of the data cable 245 is passed through the through hole 2473, and connected to the data pin of the data plug 2483 of the first composite plug 248 or the data plug 2493 of the second composite plug 249; the other end of the data cable 245 is connected to the data connector 244.

In assembly, the composite connector 241 is positioned between the two fixing members 201, and the sliding protrusion 2475 is slidably received in the sliding slot 2017, thus the composite connector 241 can slide between the fixing members 201. The first hard disk 22 is positioned between the connecting member 203 and the composite connector 241. A screw threads though the guide hole 2014 of the fixing member 201, and engages in the threaded hole of the main body 221, to fix the first hard disk 22 in the frame 20. The composite connector 241 is pushed toward the first hard disk 22, the first composite plug 248 is inserted into the receiving slot 224, the electrical plug 2481 engages with the power receptacle 2231 of the first hard disk 22, and the data plug 2483 engages with the data receptacle 2233 of the first hard disk 22. The partition portion 2485 of the first composite plug 248 is latched in the slot 2235, to prevent the relative movement of the first composite plug 248 and the composite receptacle 223. The second hard disk 23 is inserted between the two fixing members 201, and the second composite plug 249 engages with the composite receptacle 233 of the second hard disk 23 in the same manner as the first composite plug 248. Then the second hard disk 23 is also fixed on the frame 20 by the screws. The electrical connector 243 and the data connector 244 may be connected to a motherboard of a computer, and data may be transmitted between the motherboard and the first and second hard disks 22 and 23 via the data cable 245.

The composite connector 241 includes the first composite plug 248 for connecting with the first hard disk 22 and the second composite plug 249 for connecting with the second hard disk 23, respectively. Thus the first hard disk 22 and the second hard disk 23 can be mounted on the frame 20 together, and the cables connected to the first hard disk 22 and the second hard disk 23 may be simplified, and convenient for mount or detachment.

It is understood that the number of composite plugs 248 and 249 may be changed according to the number of hard disks 22 and 23. That is, if a third hard disk is needed, the composite connector 241 may further include a third composite plug (not shown) for engaging with the third hard disk; if more hard disks are needed, more composite plugs would be added accordingly.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A hard disk assembly comprising: a first and a second hard disks, both hard disks each having a composite receptacle, a hard disk connecting mechanism for holding the first and the second hard disks, wherein the hard disk connecting mechanism comprises a frame for mounting the first and the second hard disks and a composite connector detachably positioned in the frame, the composite connector comprises a longitudinal base, a first composite plug engaged with the composite receptacle of the first hard disk and a second composite plug engaged with the composite receptacle of the second hard disk, the frame defines a sliding slot, and the base forms a sliding protrusion slidably received in the sliding slot to slidably position the composite connector in the frame; wherein the first composite plug of the first hard disk comprises an electrical plug, a data plug and a partition portion between the electrical plug and the data plug; the first composite receptacle comprises a power receptacle for receiving the electrical plug, a data receptacle for receiving the data plug and a slot between the power receptacle and the data receptacle for receiving the partition portion; wherein the hard disk assembly further comprising a plurality of electrical cables, the base defines a plurality of wire holes, an end of the electrical cable passes through the wire hole and is connected with the electrical plug of the first composite plug, and the other end of the electrical cable is exposed out of the base; and wherein the hard disk assembly further comprising an electrical connector mounted on the end of the electrical cable exposed out of the base.

2. The hard disk assembly of claim 1, wherein the second composite plug of the second hard disk comprises an electrical plug, a data plug and a partition portion between the electrical plug and the data plug; the second composite receptacle comprises a power receptacle for receiving the electrical plug, a data receptacle for receiving the data plug and a slot between the power receptacle and the data receptacle for receiving the partition portion.

3. The hard disk assembly of claim 1, further comprising a plurality of data cables, the base defines a plurality of through holes, an end of the data cable passes through the through hole and is connected with the data plug of the first composite plug, and the other end of the data cable is exposed out of the base.

4. The hard disk assembly of claim 3, further comprising a data connector mounted on the end of the data cable exposed out of the base.

5. The hard disk assembly of claim 1, wherein the frame comprises two fixing members and a connecting member interconnecting the two fixing members, the first and the second hard disks are positioned between the two fixing members.

6. The hard disk assembly of claim 5, wherein each fixing member comprises a longitudinal support portion and a fixing portion perpendicularly extending at an end of the support portion, and the fixing portion is fixed on the connecting member.

7. A hard disk connecting mechanism for holding a first and a second hard disk, each of the first and second hard disks has a composite receptacle, the hard disk connecting mechanism comprising: a frame for mounting the first and the second hard disks; and a composite connector detachably positioned in the frame, wherein the composite connector comprises a longitudinal base, a first composite plug engaged with the composite receptacle of the first hard disk and a second composite plug engaged with the composite receptacle of the second hard disk, the frame defines a sliding slot, the base forms a sliding protrusion slidably received in the sliding slot to slidably position the composite connector in the frame; wherein the first composite plug of the first hard disk comprises an electrical plug, a data plug and a partition portion between the electrical plug and the data plug; the first composite receptacle comprises a power receptacle for receiving the electrical plug, a data receptacle for receiving the data plug and a slot between the power receptacle and the data receptacle for receiving the partition portion; wherein the hard disk connecting mechanism further comprising an electrical cable, the base defines a plurality of wire holes, an end of the electrical cable passes through the wire hole and is connected with the electrical plug of the first composite plug, and the other end of the electrical cable is exposed out of the base; and wherein the hard disk connecting mechanism further comprising an electrical connector mounted on the end of the electrical cable exposed out of the base.

8. The hard disk connecting mechanism of claim 7, further comprising a plurality of data cables, the base defines a plurality of through holes, an end of the data cable passes through the through hole and is connected with the data plug of the first composite plug, and the other end of the data cable is exposed out of the base.

9. The hard disk connecting mechanism of claim 8, further comprising a data connector mounted on the end of the data cable exposed out of the base.

10. The hard disk connecting mechanism of claim 7, wherein the frame comprises two fixing members and a connecting member interconnecting the two fixing members, and the first and the second hard disks are positioned between the two fixing members.

11. The hard disk connecting mechanism of claim 10, wherein each fixing member comprises a longitudinal support portion and a fixing portion perpendicularly extending at an end of the support portion, and the fixing portion is fixed on the connecting member.

* * * * *